United States Patent [19]

Kinbara et al.

[11] Patent Number: 5,083,001
[45] Date of Patent: Jan. 21, 1992

[54] WAVEFORM CONTROL DEVICE FOR ELECTRICAL DISCHARGE MACHINING APPARATUS

[75] Inventors: Yoshihide Kinbara; Morihisa Nishikawa; Yoshio Ozaki, all of Aichi, Japan

[73] Assignee: Mitsubishi Denki K.K., Tokyo, Japan

[21] Appl. No.: 537,720

[22] Filed: Jun. 14, 1990

[30] Foreign Application Priority Data

Aug. 8, 1989 [JP] Japan ................... 1-203871

[51] Int. Cl.⁵ .............................................. B23H 1/02
[52] U.S. Cl. ................................................ 219/69.18
[58] Field of Search ..................... 219/69.13, 69.18; 323/223, 282, 285, 287, 290

[56] References Cited

U.S. PATENT DOCUMENTS

| | | | |
|---|---|---|---|
| 3,832,510 | 8/1974 | Pfau et al. | 219/69.13 |
| 4,163,887 | 8/1979 | Bühler et al. | 219/69.18 |
| 4,678,885 | 7/1987 | Dresti et al. | 219/69.13 |
| 4,713,516 | 12/1987 | Bühler et al. | 219/69.18 |
| 4,945,199 | 7/1990 | Tanaka et al. | 219/69.13 |
| 5,019,770 | 5/1991 | Harada et al. | 323/282 |

FOREIGN PATENT DOCUMENTS

| | | | |
|---|---|---|---|
| 2189936 | 1/1974 | France. | |
| 49-43297 | 4/1974 | Japan. | |
| 57-33950 | 7/1982 | Japan. | |
| 62-88512 | 4/1987 | Japan | 219/69.18 |
| 673609 | 3/1990 | Switzerland. | |
| 352734 | 10/1972 | U.S.S.R. | 219/69.18 |

*Primary Examiner*—Geoffrey S. Evans
*Attorney, Agent, or Firm*—Sughrue, Mion, Zinn, Macpeak & Seas

[57] ABSTRACT

A waveform control device for an electrical discharge machine apparatus which supplies current pulses to the gap between an electrode and a workpiece for machining of the workpiece. A first D.C. source, which supplies at least a part of a voltage that is applied across the gap, is connected in parallel with first and second circuits comprising a series connection of a switch and a diode. Connected between a first and second series circuit is a switched conductive circuit which, together with an auxiliary D.C. source, maintains the current flow at a base current level. Control of operation of the switches in the first and second circuits permit a controlled discharge of current across the gap while permitting the output voltage to be clamped at a safe level. A plurality of inductive circuits may be used to provide selectivity, where the inductances are different and to provide further control of the discharge current shape. A variable inductance, whose value is proportional to the output peak current, may be used to control current ripple.

13 Claims, 12 Drawing Sheets

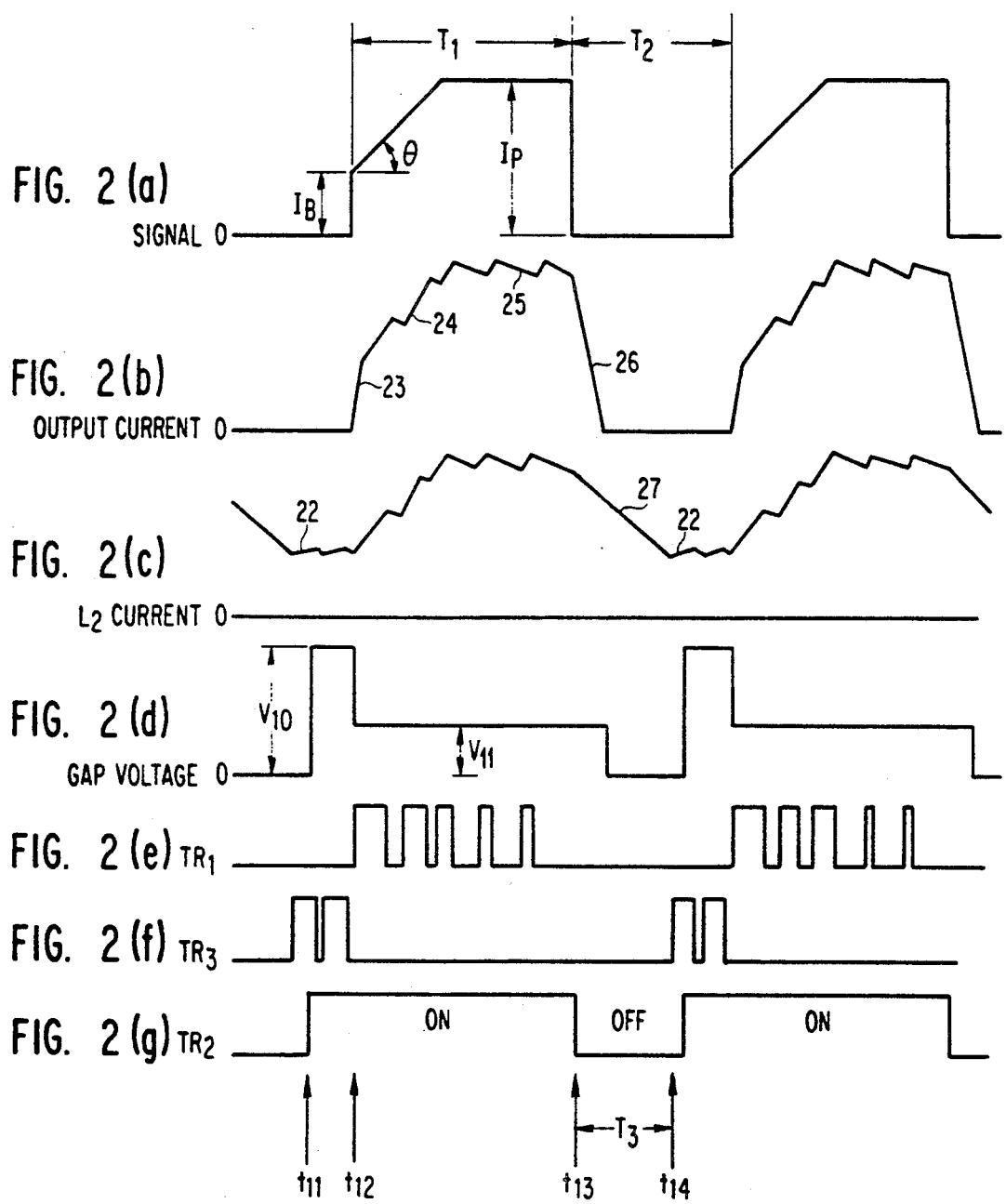

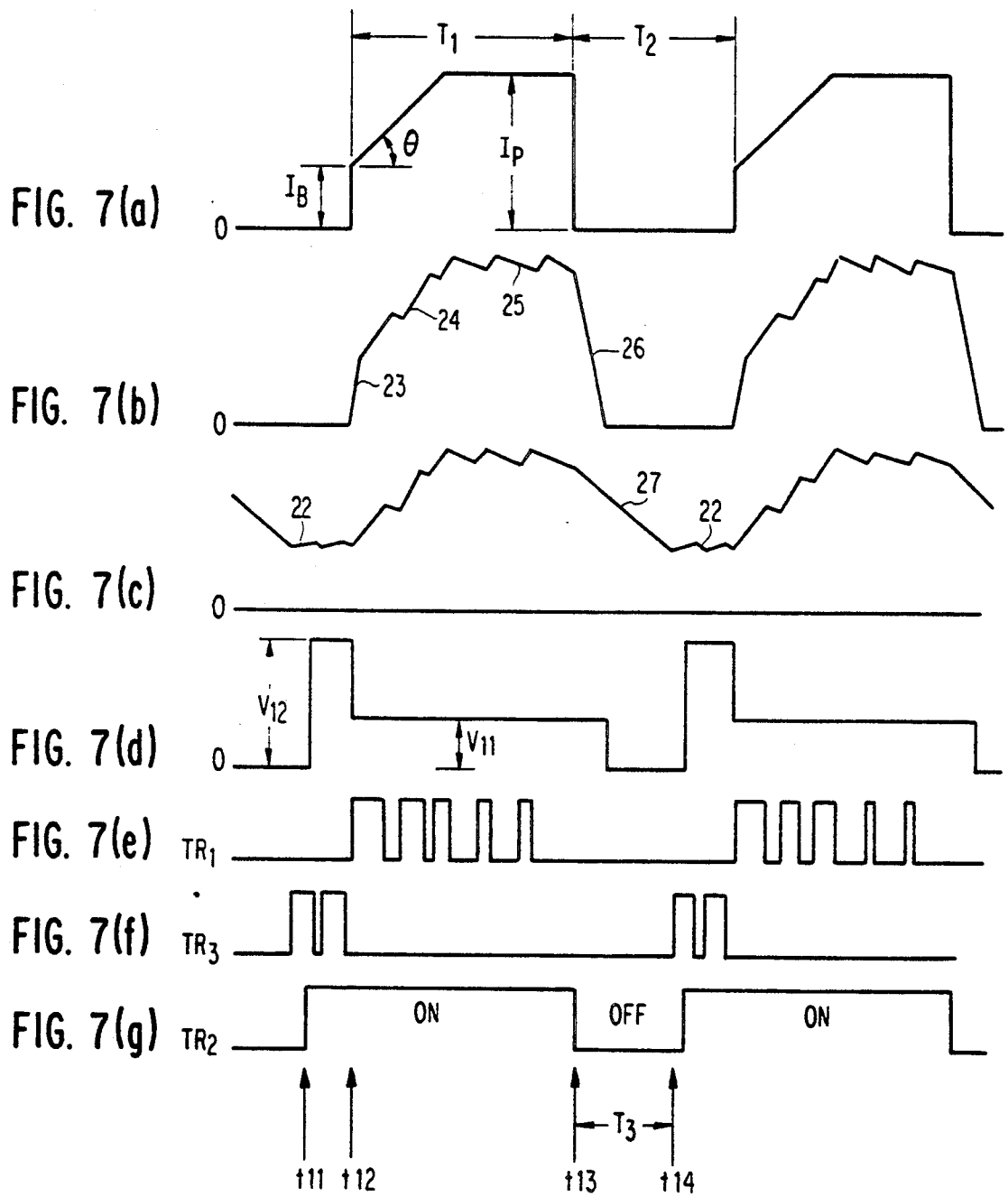

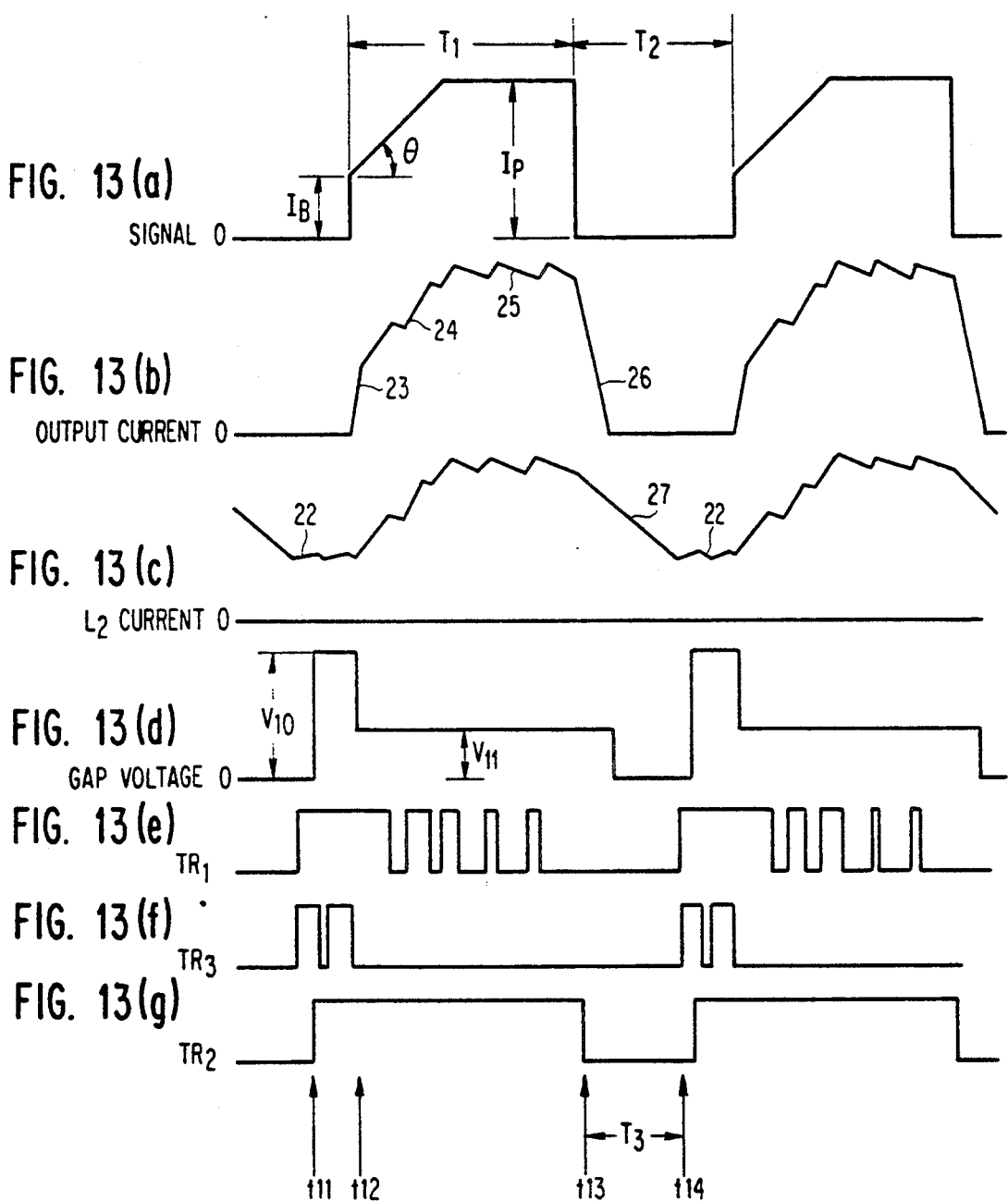

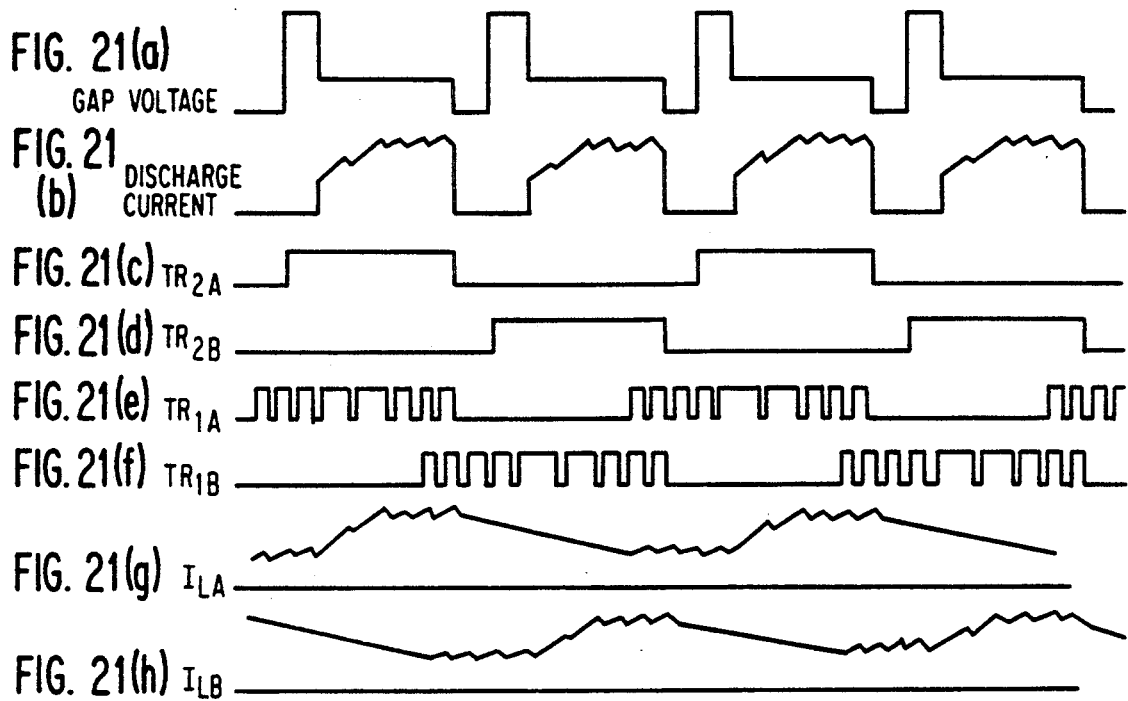
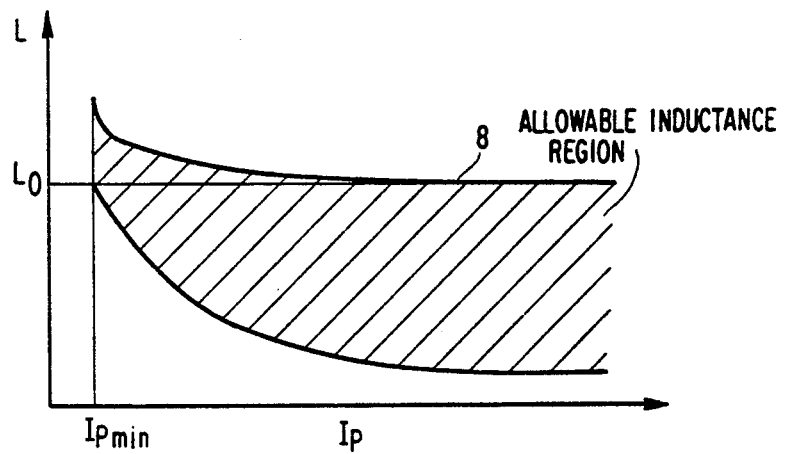

FIG. 26 PRIOR ART
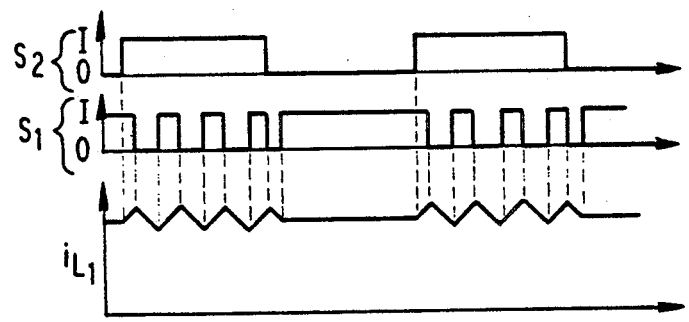
FIG. 27 PRIOR ART
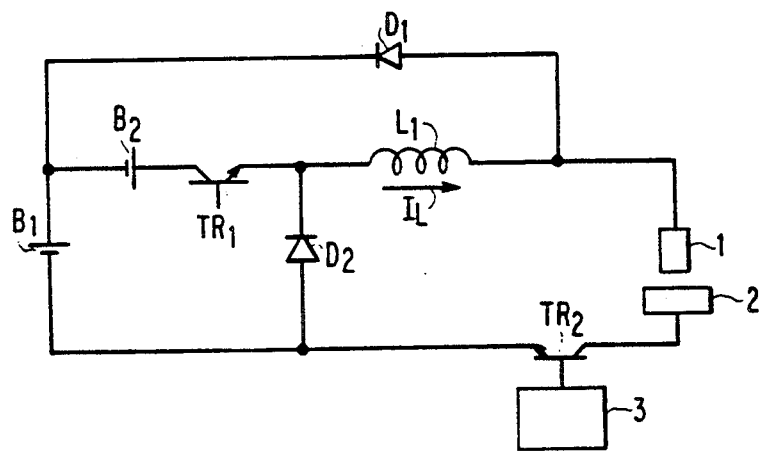
PRIOR ART
FIG. 28 (a) GAP VOLTAGE
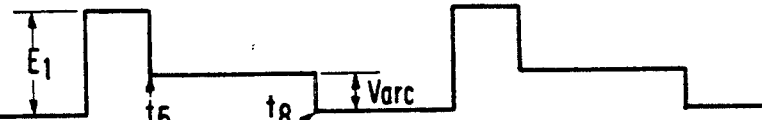
FIG. 28 (b). DISCHARGE CURRENT
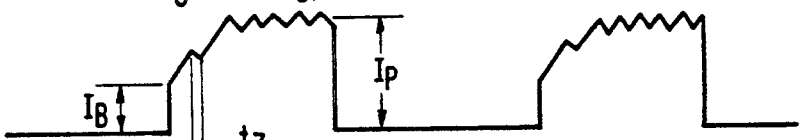
FIG. 28 (c) TR₂
FIG. 28 (d) TR₁
FIG. 28 (e) $i_L$
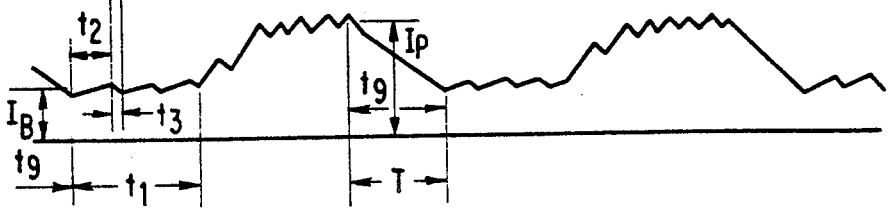

WAVEFORM CONTROL DEVICE FOR ELECTRICAL DISCHARGE MACHINING APPARATUS

BACKGROUND OF THE INVENTION

The present invention relates to a waveform control device for an electrical discharge machining apparatus.

A waveform control device for an electrical discharge machining apparatus supplies a pulsating current waveform, controlled to have a desired peak current value $I_P$, between an electrode and a workpiece to establish an electrical discharge in accordance with a set ON-OFF time so that the workpiece may be machined in a desired form. It is desirable that the pulsating current waveform closely approximate a square wave pulse so that the machining operation can be accurate, thereby requiring fast rise times and fast discharge times.

FIG. 24 is a circuit diagram showing the waveform control device of the prior art, as exemplified by Japanese Kokai No. 49-43297 or Japanese Utility Model Publication No. 57-33950. In FIG. 24, an electrode 1 is positioned adjacent to a workpiece 2 to be machined. The two elements are connected in a circuit with a DC power source $B_1$ having a voltage $E_1$ (V). Also connected in the circuit is an auxiliary power source $B_2$, having a voltage $E_2$ (V), and a choke induction coil $L_1$ constituting a magnetic energy reservoir. A switch $S_1$ is connected in series between the auxiliary source $B_2$ and the coil $L_1$ for controlling the electric current flowing through the coil $L_1$ to a desired value. Another switch $S_2$, which is ON-OFF controlled by a pulse generator (not-shown) is connected in series between power source $B_1$ and the workpiece 2. Diodes $D_1$ and $D_2$ are placed in the circuit to direct the current flow.

The ON-OFF timing of the switches $S_1$ and $S_2$ and the waveform of the electric current $i_{L1}$ flowing through the coil $L_1$ of the aforementioned circuit are illustrated in FIGS. 25 and 26. FIG. 25 shows the operation when the machining apparatus is performing a finishing step on a workpiece whereas FIG. 26 shows the operation when a rough machining step is performed. In each of these figures, the switches $S_1$ and $S_2$ assume states 1 and 0, which are conductive at 1 and non-conductive at 0.

With this circuit structure, the coil $L_1$ is connected in series between the electrode 1 and switch $S_1$ so that the coil acts as an energy reservoir. Accordingly, when the coil $L_1$ is changed from its saturated to its unsaturated states or vice versa by operation of switches $S_1$ and $S_2$, the discharge current from the coil is abruptly changed. For example, if the switch $S_1$ is ON, the current through the coil $L_1$ substantially increases so long as the switch $S_2$ is ON. If the switch $S_2$ is OFF, while switch $S_1$ is ON, the current of the coil $L_1$ is maintained at a substantially constant level because a closed circuit through diode $D_2$ is formed. If the switch $S_1$ is turned OFF, any stored energy in the coil is released and the current of the coil $L_1$ will decrease regardless of whether the switch $S_2$ might be ON or OFF. When both switches $S_1$ and $S_2$ are OFF, the current flows in a circuit comprising power supply $B_1$, diode $D_1$, coil $L_1$ and diode $D_2$ and settles at a steady state level. When a discharge occurs across the gap between electrode 1 and workpiece 2, a current will flow and the voltage across the elements will drop. As a result, a waveform control circuit using a coil as a discharge current limiting element has advantages over a waveform control circuit using a resistor as the current limiting element since there is no resistor to consume energy.

In the circuit constructed in accordance with FIG. 24, however, there is a wiring inductance $L_3$ that exists in connection with the electrode 1 and the workpiece 2. Typically, the wires are several meters long and the resulting inductance is significant, since it will tend to make the current across the gap constant and, thereby extend the period of current flow. As a result of this wiring inductance, a high voltage is generated which can break down switching element $S_2$ if it is a MOSFET (Metal Oxide Semiconductor Field Effect Transistor) or other transistor, thereby adversely affecting the circuit reliability.

FIG. 27 is a circuit diagram showing an example of the prior art using transistors $TR_1$ and $TR_2$ as the switches $S_1$, $S_2$ of the foregoing circuit. The switching element $TR_2$ is ON-OFF controlled by an oscillation control circuit 3. The wiring inductance $L_3$ is not shown but remains effective in this circuit. FIG. 28 is a timing chart showing in waveform (a) the inter-electrode voltage, in waveform (b) the discharge current, in waveforms (c) and (d) the ON-OFF timing of the switching elements $TR_2$ and $TR_1$, and in waveform (e) the current flowing through the coil $L_1$. The discharge current waveform (b) may be controlled by a waveform control method called "slope control". This method is particularly effective for low consumption of the electrodes. According to this method, the discharge current seen in waveform (b) is steeply raised to a base current level having a value $I_B$ and is then increased at a predetermined rate to, and maintained at the peak value $I_P$, from which it then should drop rapidly. Specifically, with reference to the coil current in waveform (e), initially during period $t_1$, switching element $TR_1$ is switched between ON-OFF states (waveform d) to set the current of the coil $L_1$ at $I_B$. The current is set in a step-wise fashion, as seen in waveform (e). For a period $t_2$, when $TR_1$ is ON, the current flows at an increasing rate via a path including the auxiliary power source $B_2$, the switching element $TR_1$, the coil $L_1$ and the diode $D_1$. The increasing rate is expressed by the following Equation if the coil $L_1$ has an inductance L ($\mu$H):

$$di/dt = E_2/L \ (A/\mu s) \qquad (1).$$

Then, for a period $t_3$, while both $TR_2$ and $TR_1$ are OFF, the current flows at a decreasing rate via a path including the DC power source $B_1$, the diode $D_2$, the coil $L_1$ and the diode $D_1$. The decreasing rate is expressed by the following Equation:

$$di/dt = E_1/L \ (A/\mu s) \qquad (2).$$

At time $t_4$, the switching element $TR_2$ is turned ON, while switching element $TR_1$ continues to turn ON and OFF, to impress the so called "unloading voltage" ($E_1$) between the electrode 1 and workpiece 2. Then, if a discharge takes place in the gap between the electrode and workpiece at time $t_5$, the current flows at a generally increasing rate during a period between times $t_5$ and $t_8$ through a path including the DC power source $B_1$, the auxiliary power source $B_2$, the switching element $TR_1$, the coil $L_1$, the electrode 1, the workpiece 2 and the switching element $TR_2$. On discharge the voltage across the gap will decrease from $E_1$ to $V_{arc}$, the arc voltage at which the arc discharge is extinguished. This This increasing rate is expressed by the following Equation:

$$di/dt = (E_1 + E_2 - V_{arc})/L \ (A/\mu s) \quad (3).$$

If during the period between times $t_5 - t_8$, when $TR_2$ is ON, the switching element $TR_1$ is turned ON for a period $t_6$, the current flows at an increasing rate through a path including power supplies $B_1$ and $B_2$, switching elements $TR_1$ and $TR_2$, coil $L_1$, electrode 1 and workpiece 2. This increasing rate is expressed by:

$$di/dt = (E_1 + E_2 - V_{arc})/L \ (A/\mu s) \quad (4).$$

However, when $TR_1$ is turned OFF for a period $t_7$, the current flows at a decreasing rate through a path including the diode $D_2$, the coil $L_1$, the electrode 1, the workpiece 2 and the switching element $TR_2$. This decreasing rate is expressed by:

$$di/dt = V_{arc}/L \ (A/\mu s) \quad (5).$$

If both the switching elements $TR_1$ and $TR_2$ are turned OFF at time $t_8$, the discharge current is blocked, as seen in waveform (b). As a result, the current $I_L$ through the coil $L_1$ (the "breaking current") will flow at a decreasing rate for a period $t_9$, until it reaches level $I_B$, as seen in waveform (e). During period $t_9$, the breaking current $I_L$ flows along a path including the DC power source $B_1$, the diode $D_2$, the coil $L_1$ and the diode $D_1$. The decreasing rate is expressed by:

$$di/dt = E_1/L \ (A/\mu s) \quad (6).$$

Hence, the time period for the current $I_L$ to decrease from $I_P$ to $I_B$, i.e. the dropping period of the breaking current, is calculated by:

$$T = L(I_P - I_B)/E_1 (\mu s) \quad (7).$$

In the case of waveform control by the slope control method in which the current is increased at an increasing rate from the value $I_B$, defined by $I_B \leq I_P (I_B \geq 0)$ as illustrated in FIG. 28, it is necessary to allow $I_L$ to drop to reach the condition of $I_L = I_B$ between cycles. As a result, the circuit of FIG. 27 is troubled by a problem that the quiescent period of the breaking current cannot be made shorter than the time period T of the foregoing Equation (7). In order to shorten the time period T, it is sufficient to insert a resistance into the path during the time period $t_9$ to thereby change the energy to heat. However, this modification is contrary to the aforementioned goal of energy economy.

SUMMARY OF THE INVENTION

It is, therefore, an object of the present invention to provide a circuit which is well suited to waveform control, which can prevent establishment of a damaging high voltage at the transistor $TR_2$, permit base current $I_B$ to rise quickly, and shorten the dropping period of the breaking current.

A second object of the present invention is to provide a circuit which may achieve the desired energy economy by minimizing the restrictions upon the quiescent period and the current ripple ratio.

A third object of the present invention is to provide a circuit which can be produced at a reasonable cost by using an auxiliary power source $B_2$ having a small current capacity.

Yet another object is to compensate for the effect of wiring inductance on circuit switch reliability.

The remaining objects of the present invention will become apparent from the following description, in connection with the embodiments thereof with reference to the accompanying drawings.

According to a first embodiment of the present invention, there is provided a waveform control device for an electrical discharge machining apparatus, which device comprises: a first series circuit connected in parallel with a first DC power source and including a switching element and a diode; a second series circuit connected in parallel with the first DC power source and including a second DC power source, a switching element and a diode; a reactor disposed in a circuit including an electrode and a workpiece and connecting the node between the switching element and diode of the first series circuit and the node between the switching element and diode of the second series circuit; a third switching element disposed in a circuit connecting the node between the second DC power source and said diode and the node between the switching element and diode of the first series circuit; and a third diode disposed in a circuit connecting the node between the first DC power source and the second DC power source and the node between the reactor and the electrode or the workpiece.

According to a second embodiment of the present invention, there is provided a waveform control device for an electrical discharge machine apparatus, which device comprises: a first series circuit and a second series circuit connected in parallel with a first DC power source and each including a switching element and a diode; a reactor disposed in a circuit including an electrode and a workpiece and connecting the node between the switching element and diode of the first series circuit and the node between the switching element and diode of the second series circuit; a second DC power source and a third diode disposed in series in a circuit connecting the node between the first DC power source and the second series circuit and the node between the reactor and the electrode or the workpiece; and a third switching element and a fourth diode disposed in series in a circuit connecting the node between the second DC power source and the third diode and the node between the switching element and diode of the first series circuit.

According to a third embodiment of the present invention, there is provided a waveform control device for an electrical discharge machining apparatus, which device comprises: a first series circuit connected in parallel with a first DC power source and including a switching element and a diode; a second series circuit connected in parallel with the first DC power source and including a second DC power source, a switching element and a diode; a third series circuit connected in parallel with the first DC power source and including a switching element and a diode; a fifth diode disposed in a circuit including an electrode and a workpiece and connecting the node between the switching element and diode of the third series circuit and the node between the switching element and diode of the second series circuit; and a reactor connected between the node between the switching element and diode of the first series circuit and the node between the switching element and diode of the third series circuit.

The single reactor of each of the aforementioned circuits may be of the variable capacity type which may have its inductance value changed and controlled in accordance with the peak current value of the electrical discharge. In case a plurality of reactors are used, their inductance values may be equalized for cyclic operations at each circuit.

BRIEF DESCRIPTION OF THE DRAWINGS

FIGS. 2(a) to 2(g) are timing charts explaining the current waveforms of the circuit of FIG. 1 and the timing of the switching elements.

FIGS. 7(a) to 7(g) are timing charts explaining the current waveforms of the circuit of FIG. 6 and the timing of the switching elements.

FIGS. 13(a) to 13(g) are timing charts explaining the current waveforms of the circuit of FIG. 12 and the timing of the switching elements.

FIGS. 21(a), 21(b), 21)c), 21(d), 21(e), 21(f), 21(g) and 21(h) are timing charts showing operations of the fifth embodiment.

FIG. 22 is a graph presenting the region of allowable inductance values.

FIG. 25 and 26 are timing charts for the circuit of FIG. 24.

FIG. 27 is a circuit diagram showing another example of the prior art.

FIGS. 28(a), 28(b), 28(c), 28(d), and 28(e) are timing charts for the circuit for FIG. 27.

DESCRIPTION OF THE PREFERRED EMBODIMENTS

Figure 1:
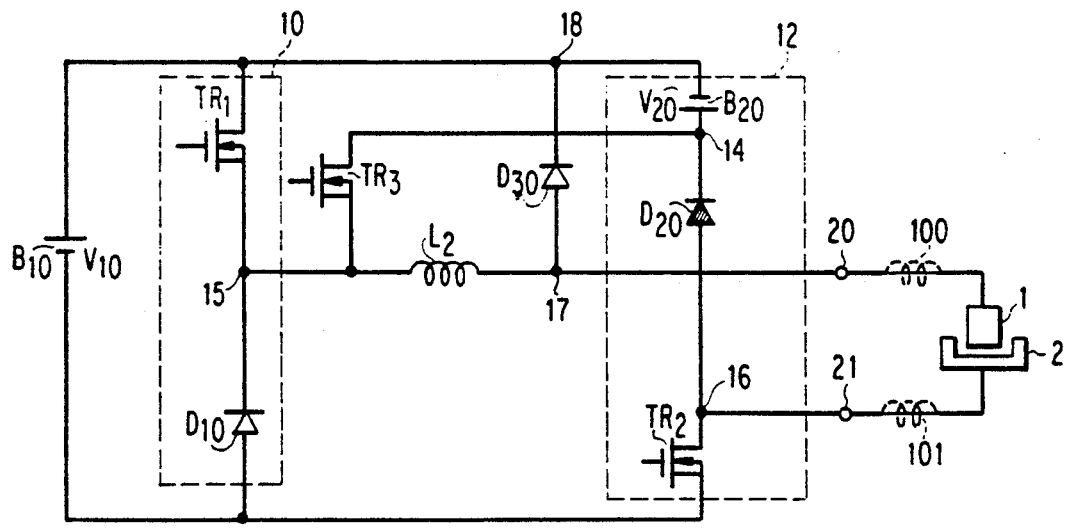
FIG. 1 is a circuit diagram showing a first embodiment of the present invention.

The waveform control device of the present invention will be described in connection with several embodiments, with reference to the accompanying drawings. FIG. 1 is a circuit diagram showing a first embodiment of the present invention. Switching elements appearing in FIG. 1 are exemplified by MOSFETs but may comprise other electrical switches such as semiconductor switches generally.

In FIG. 1, there is connected in parallel with a first DC power source $B_{10}$ a first series circuit 10, which includes a switching element $TR_1$ and a diode $D_{10}$, having a node 15 defined between them. A second series circuit 12, including a second DC power source $B_{20}$, a diode $D_{20}$ and a switching element $TR_2$, is also connected in parallel with the first DC power source $B_{10}$. Node 14 is defined between the power source $B_{20}$ and the diode $D_{20}$ and node 16 is defined between the diode $D_{20}$ and the switching element $TR_2$. A third switching element $TR_3$ is connected between the node 15 in the first series circuit 10 and the node 14 in the second series circuit 12. Connected to node 16, at one output terminal 21 of the waveform control device, is workpiece 2. An electrode 1 is connected at the other output terminal 20, which also is tied to an internal node 17. A reactor $L_2$ is connected between the electrode 1, through output terminal 20, and the node 15. A third diode $D_{30}$ is connected between the node 17 and a node 18, located between the first DC power source $B_{10}$ and the second DC power source $B_{20}$. The components are sized so that a machining current may be fed between the electrodes.

In the preferred embodiments, it is assumed that inductances 100 and 101 will exist for the electrode 1 and the workpiece 2, respectively, due to the wiring. The first DC power source $B_{10}$ will produce voltage $V_{10}$ in a range of 60 to 150 V, and the second DC power source $B_{20}$ will produce voltage $V_{20}$ in a range of 5 to 30 V.

FIGS. 2(a)–2(g) illustrate waveforms and timings that are relevant to the operation of the waveform control device of FIG. 1. The waveform in FIG. 2(a) is an optimum current waveform to be output by the waveform control device of the present invention. In this case, a base current $I_B$ is selected at about ⅓ of a peak current $I_P$ so that the output current may rise from $I_B$ to $I_P$ as quickly as possible. The gradient $\theta$ of the slope of the current rise reflects a constant rate of increase for the current. A single discharge comprises the combination of a discharge period $T_1$ and a breaking period $T_2$.

The waveform in FIG. 2(b) represents the actual output (or discharge) current from the device as a function of time while the waveform in FIG. 2(c) illustrates the current of the reactor $L_2$ as a function of time. Numeral 22 designates the minimum or base current $I_B$ in the waveform of FIG. 2(c).

FIG. 2(d) illustrates the timing for the inter-electrode voltage across the gap between the electrode 1 and workpiece 2. FIGS. 2(e), 2(f) and 2(g) illustrate the timings for switching the switching elements $TR_1$, $TR_2$ and $TR_3$, respectively.

Turning to a description of the operation of the first embodiment of the invention, reference is made to FIG. 1 and FIGS. 2(a)–2(g). In the steady state, no discharge is caused in the circuit of FIG. 1 and the switching element $TR_3$ is switched between OFF and ON whereas the switching elements $TR_1$ and $TR_2$ are OFF. Thus element $TR_3$ is ON, the base current $I_B$ flows through a path composed of the reactor $L_2$, the diode $D_{30}$, the second DC power source $B_{20}$ and the switching element $TR_3$. When the switching element $TR_3$ is OFF, on the other hand, the base current $I_B$ flows through a second loop composed of the reactor $L_2$, the diode $D_{30}$, the first DC power source $B_{10}$ and the diode $D_{10}$, all to maintain the current flowing through the reactor $L_2$ at a constant level. In short, switching element $TR_3$ is switched on and off to apply the voltage of power source $B_{20}$ to the reactor $L_2$ to maintain the current through the reactor $L_2$ at a generally constant level. In any case, as seen from the initial portions of the waveforms in FIGS. 2(c)–2(g), prior to time $t_{11}$ when $TR_2$ goes ON, the current is steady at $I_B$ and no voltage appears across the interelectrode gap.

If the switch element $TR_2$ is turned ON at time $t_{11}$ of FIG. 2(g), while $TR_3$ is ON and after the steady state base current $I_B$ has been established as described above, a voltage is applied between the output terminals 20 and 21, i.e., across the electrode gap between the electrode 1 and the workpiece 2, as shown in FIG. 2(d). The voltage applied is the voltage $V_{10}$ of the first DC power source $B_{10}$, and is called the "unloading voltage". Discharge will be effected at this voltage level.

If discharge takes place at time $t_{12}$, the switching element $TR_3$ is turned OFF and the switching element $TR_1$ is turned ON, while $TR_2$ remains ON. This switching state is illustrated in FIG. 2(e), and the output current at this time begins to increase rapidly as seen in FIG. 2(b). Also, at this time, the inter-electrode voltage between the electrode 1 and the workpiece 2 has dropped to a discharge voltage $V_{11}$ which is lower than the unloading voltage $V_{10}$ by 25 to 40 V. Accordingly, with node 17 being at $V_{11}$ and node 18 being at $V_{10}$, a reverse bias is placed across diode $D_{30}$ and the base current $I_B$, which had been flowing through the diode $D_{20}$ in the first steady state loop, begins to flow through the output terminal 20 to the electrode 1.

Since the reactor $L_2$ already had a current flow via the first steady state loop, the output current $I_B$ rises steeply to the base current level $I_B$, as indicated at 23 in FIG. 2(b) The output current continues a stepped rise as switch $TR_1$ is repeatedly switched, as indicated at 24, until it reaches the peak current $I_P$. Once at the peak current $I_P$, the switching element $TR_1$ continues to be switched in order to maintain the output current 25 at the peak level $I_P$. When $TR_1$ is ON, voltage $V_{10}$ is applied to the electrode directly and current rises while when $TR_1$ is OFF, output current drops slightly. The $TR_1$ ON time is larger than the OFF time during the current rise but once the peak current is reached, the OFF time is longer. Due to the effect of reactor $L_2$, element TR, may be turned off and left off some time before the end of the discharge period $T_1$.

After lapse of the discharge period $T_1$, the switching element $TR_2$ is turned OFF at time $t_{13}$ FIG. 2(g). Since switches $TR_1$ and $TR_3$ already are OFF, the output current flow at the level $I_P$ drops. Specifically, due to the effect of the wiring inductances 100 and 101 between the output terminals 20 and 21 and the electrode 1 and the workpiece 2, respectively, the output current that was flowing through the electrode 1, now flows through the diode $D_{20}$, the second DC power source $B_{20}$ and the diode $D_{30}$ and abruptly drops, as indicated at 26 in FIG. 2(b). This current is called the "breaking current". At this same time, current is flowing forward in the reactor $L_2$, as indicated at 27 in FIG. 2(c), and thus in the forward direction through diode $D_{30}$, so that the breaking current can flow backward through the diode $D_{30}$. This results in currents flowing in opposite directions at $D_{30}$ that will cancel each other. This feature causes the output current to drop quickly, notwithstanding the effect of the wiring inductances. As a result, the surge voltage applied to the switching element $TR_2$ is clamped at the sum of the voltage $V_{10}$ of the first DC power source $B_{10}$ and the voltage $V_{20}$ of the second DC power source $B_{20}$. This clamping will prevent the switch $TR_2$ from being burned out by the voltage surge. Viewed another way, the circuit of $D_{20}$, $D_{30}$ and $B_{20}$ will act as an absorbing circuit for the current flow due to the wiring inductances. As noted above, the current through the reactor $L_2$ decreases for the period (from the time $t_{13}$ to $t_{14}$) indicated at 27 in FIG. 2(c), because all the switching elements $TR_1$, $TR_2$ and $TR_3$ are OFF. This decrease is promptly effected because the peak current $I_P$ is fed back through the reactor $L_2$, the diode $D_{30}$, the first DC power source $B_{10}$ and the diode $D_{10}$ by turning the switch element $TR_2$ OFF, as shown in FIG. 1.

When the peak current $I_P$ decreases to the level of the base current $I_B$, as seen in the quiescent period between portions 27 and 22 of FIG. 2(c), the switching element $TR_3$ begins performing its switching at the time $t_{14}$ of FIG. 2(g) to maintain the current of the reactor $L_2$ at the base current $I_B$.

With the switching timings specified above, the current waveform for electrical discharge machining can be controlled to output the optimum discharge current, to achieve low consumption of the electrode 1 and high machining speed.

Figure 3:
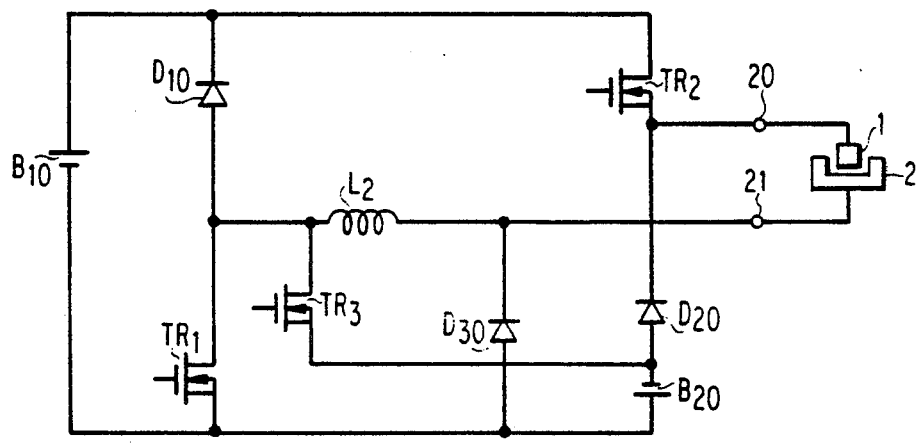
FIGS. 3 to 5 are circuit diagrams showing modifications of the first embodiment.

Next, FIG. 3 shows a modification, in which the switching elements $TR_1$, $TR_2$ and $TR_3$ and the diodes are shifted from the positions of FIG. 1. This modification operates in a manner similar to the circuit of FIG. 1.

Figure 4:
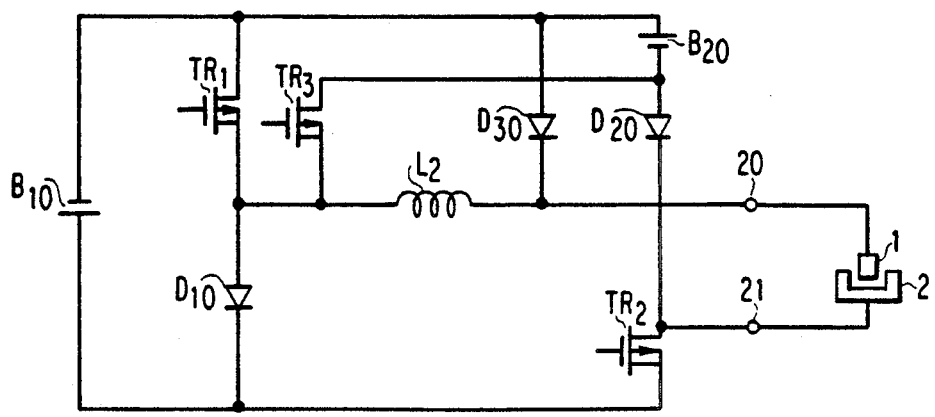

FIG. 4 shows another modification, in which the switching elements of FIG. 1 are exemplified by P-channel MOSFETs. This modification accomplishes the operations of the circuit of FIG. 1 by making the same connections while inverting the polarities of the first DC power source $B_{10}$ and the second DC power source $B_{20}$.

Figure 5:
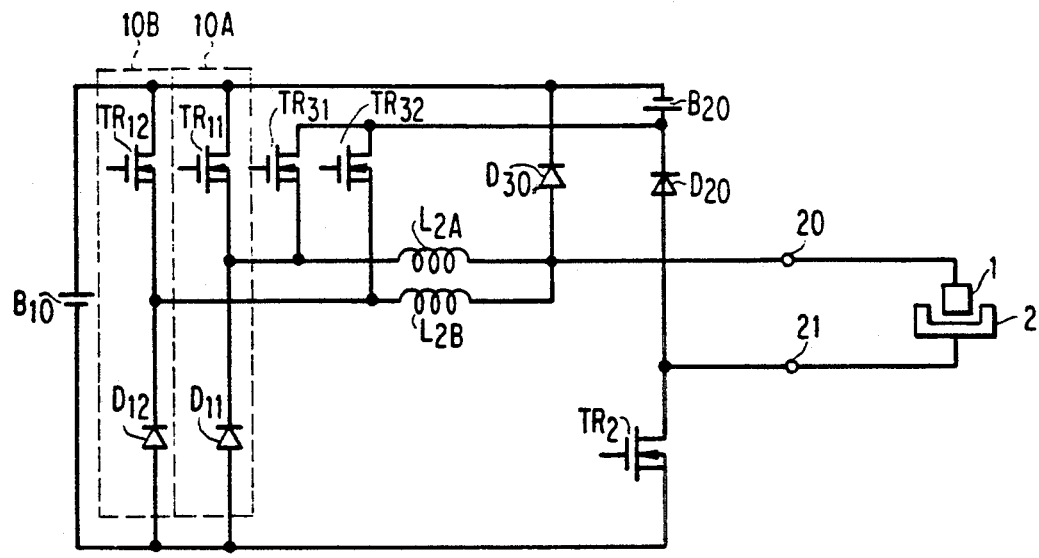

FIG. 5 shows still another modification in which the circuit of FIG. 1 is effectively duplicated and joined into a single circuit. In this modification, two series circuits, i.e., a series circuit 10A, composed of a switching element $TR_{11}$ and a diode $D_{11}$, and a series circuit 10B, composed of a switching element $TR_{12}$ and a diode $D_{12}$, are connected in parallel with the first DC power source $B_{10}$. With the series circuits 10A and 10B, there are connected in parallel a switching element $TR_{31}$ and a reactor L2A, and a switching element $TR_{32}$ and a reactor L2B. These two circuits (referred to as "A and B" hereafter) can accomplish the switching operations independently or simultaneously so that the present modification has the several advantages over the circuit of FIG. 1.

Particularly, if the current shown in FIG. 2(c) has a long decreasing time period 27, it may fail to reach the base current $I_B$ by the time of the next discharge. By switching between the aforementioned pair of circuits A and B alternatively, however, the decreasing time period can be long and still permit the base current $I_B$ to be reached before the next discharge. This approach is effective when the reactor has a high inductance or when the breaking time $T_2$ of FIG. 2(a) is short. It permits a short OFF time between pulses to be obtained and enhances operating efficiency.

Reactors L2A and L2B can have identical inductances. In such case, the cycles in each of circuits A and B may be conducted concurrently, then currents can be added and higher pulse frequency obtained.

If the reactors have different inductances, the difference can be used to control current ripple. For example, if the reactor L2A has a larger inductance than reactor L2B, the circuit A performs operations similar to those of the circuit of FIG. 1 and it operates if the peak current $I_P$ is large. If, on the other hand, the reactor L2B is made to have a larger inductance than that of the reactor L2A, the circuit B can provide a stable output current having little ripple even for a small output current.

The existence of a large peak output current $I_P$ will permit the differences in current $\Delta I$ to be ignored but when $I_P$ is small, a problem arises with the difference in current $\Delta I$ where:

$$\Delta I = \frac{V_1 - V_{arc}}{L} \Delta T \quad (8)$$

where $\Delta T$ is the ON time of the switch that causes the ripple, $V_{arc}$ is the voltage across the gap between workpiece 2 and electrode 1 and $V_1$ is the voltage of $B_{10}$. Clearly, where $I_P$ is small, the reactor inductance value should be large and vice versa, as explained further in connection with FIG. 17, because a large inductance means a smaller $\Delta I$ and a small inductance means a large $\Delta I$. Thus, when there are different inductance values used in different ones of the circuits A, B, etc. the circuit having an inductance that minimizes ripple for a given $I_P$ can be selected.

Although the present invention is exemplified in FIG. 5 by a two circuit configuration, it can attain similar effects with a structure having more than two circuits. Also a variable inductance may be used, as later described.

Figure 6:
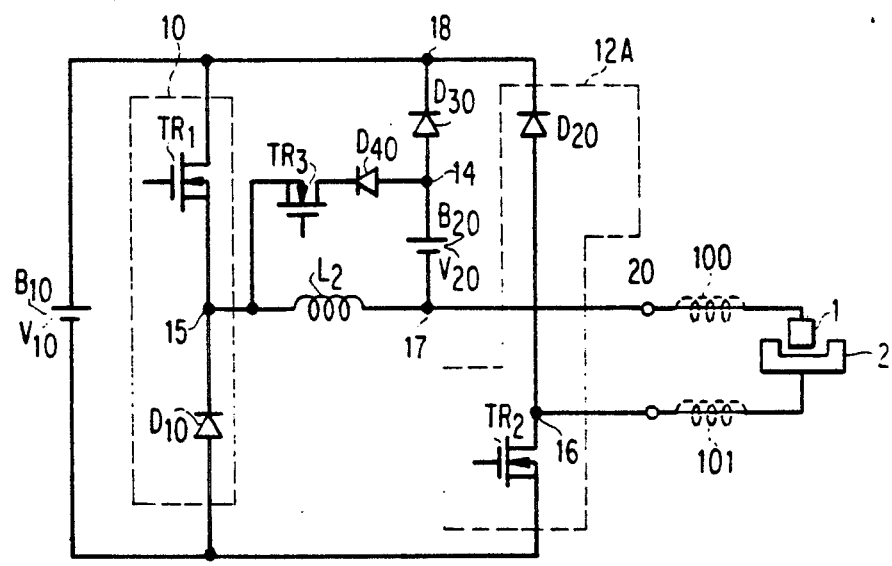
FIG. 6 is a circuit diagram showing a second embodiment of the present invention.

FIG. 6 is a circuit diagram showing a second embodiment of the present invention. This second embodiment is different from the circuit of FIG. 1 in that a second series circuit 12A is constructed to only include the diode $D_{20}$ and the switching element $TR_2$. The second DC power source $B_{20}$ is connected in series with the third diode $D_{30}$ and a node 14 is defined between them. Moreover, the switching element $TR_3$ and a fourth diode $D_{40}$ are connected in series between the node 14 and a node 15 defined between the switching element $TR_1$ and the diode $D_{10}$ of the first series circuit 10. The remaining structures are similar to those of FIG. 1.

FIGS. 7(a) to 7(g) are timing charts like those of FIGS. 2(a)-2(g). One difference in this case, however, is that the unloading voltage $V_{12}$ is the difference between the voltage $V_{10}$ of the first DC power source $B_{10}$ and voltage $V_{20}$ of the second DC power source $B_{20}$, i.e., $V_{12} = V_{10} - V_{20}$. Since the unloading voltage $V_{12}$ can be made lower than that of the circuit of FIG. 1, the interelectrode gap can be controlled more finely to improve the machining accuracy.

As in the first embodiment, during the steady state with no discharge, the switching element $TR_3$ performs its switching operation, but the switching elements $TR_1$ and $TR_2$ are OFF. As a result, the base current $I_B$ flows through the path composed of the reactor $L_2$, the second DC power source $B_{20}$, the diode $D_{40}$ and the switching element $TR_3$, while the switching element $TR_3$ is ON, and through the path composed of the reactor $L_2$, the diode $D_{30}$, the first DC power source $B_{10}$ and the diode $D_{10}$, while the switching element $TR_3$ is OFF. As before, the current flowing through the reactor $L_2$ is maintained constant, at the base current level $I_B$.

If a discharge is to take place, the switching element $TR_3$ is turned OFF, and the switching element $TR_1$ performs its switching operation. As a result, the interelectrode voltage between the electrode 1 and the workpiece 2 assumes a value equal to the discharge voltage $V_{11}$ which is lower than the unloading voltage $V_{12}$ by about 25 to 40 V. The base current $I_B$, flowing through the second DC power source $B_{20}$ flows through the output terminal 20 to the electrode 1.

Since the current has already been flowing through the reactor $L_2$, the current rises quickly from the base current $I_B$, as indicated at 23 in FIG. 7(b). The slope current 24 continues to rise, as switch $TR_1$ continues to repeat its switching. When the peak current $I_P$ is reached, the current is maintained at the constant value 25 by the $TR_1$ switching operations, until the discharge period $T_2$ begins.

When the discharge period begins, the switching element $TR_2$ is turned OFF. As a result, the current that had been flowing through the electrode 1 is diverted to the diode $D_{20}$, the diode $D_{30}$ and the second DC power source $B_{20}$ by the wiring inductances 100 and 101. The diversion continues as the output current drops, as indicated at 26 in FIG. 7(b). This breaking current can flow backward through the diode $D_{30}$ because diode $D_{30}$ is rendered conductive by the forward flow of current 27 through the reactor, as seen in FIG. 7(c). As a result, the surge current applied to the switching element $TR_2$ is clamped to the voltage $V_{10}$ of the first DC power source $B_{10}$ so that no high voltage is generated across $TR_2$.

The peak current $I_P$ is promptly reduced, when the switching element $TR_2$ is turned OFF, by the feedback through the reactor $L_2$, the second DC power source $B_{20}$, the diode $D_{30}$, the first DC power source $B_{10}$ and the diode $D_{10}$. When the peak current $I_P$ drops to the level of base current $I_B$, the switching element $TR_3$ is restored to its switching operation to maintain the current of the reactor $L_2$ at the base current $I_B$ as in the case of FIG. 1.

Figure 8:
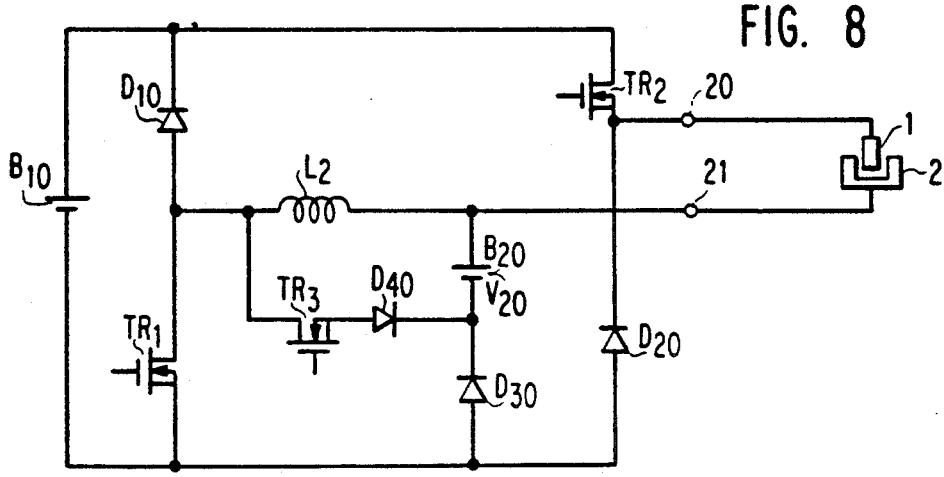
FIGS. 8 to 11 are circuit diagrams showing modifications of the second embodiment.
Figure 9:
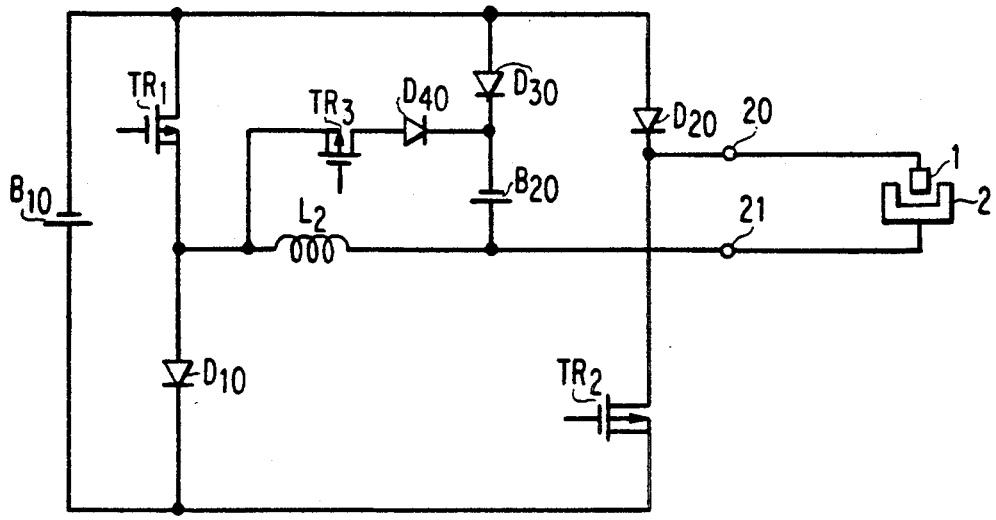
Figure 10:
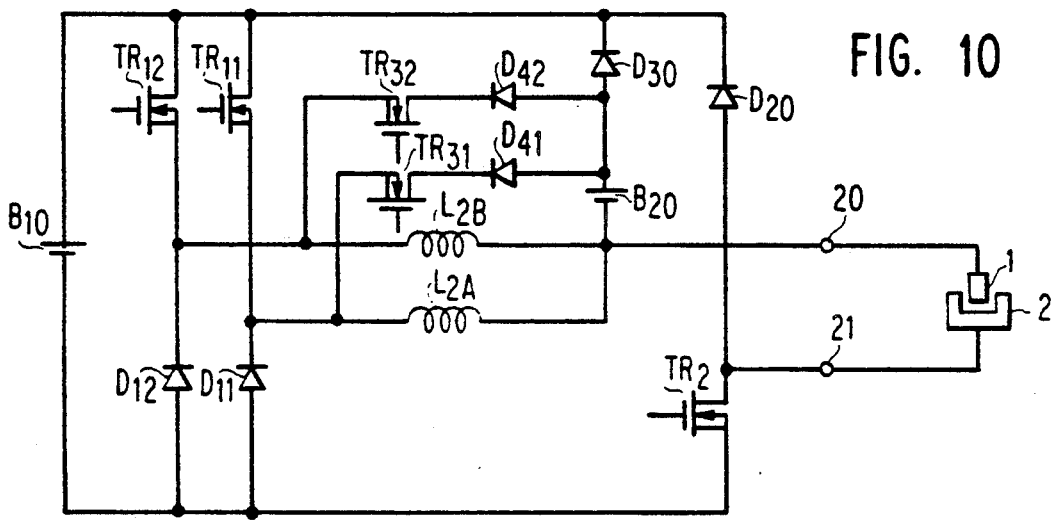

FIGS. 8 to 10 show modifications of the second embodiment that are entirely similar to the modifications of the first embodiment shown in FIGS. 3 to 5, respectively. The operation of these circuits will be apparent from an understanding of the first and second embodiments, and the modifications of the first embodiment, as presented in detail herein.

Figure 11:
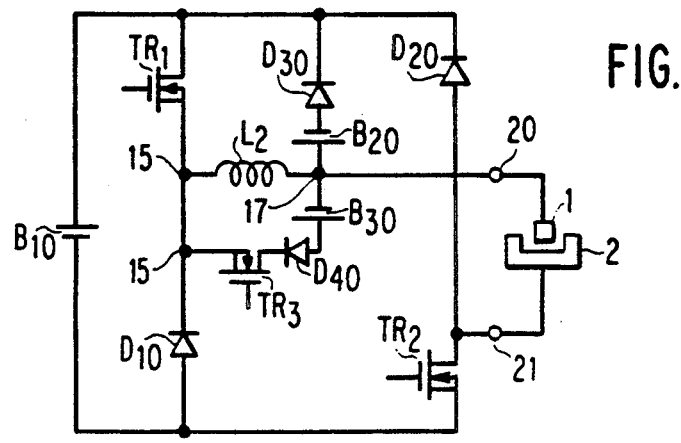

FIG. 11 shows a circuit which is similar to the circuit of FIG. 6, however at node 17, a third power source $B_{30}$ is placed in a series circuit with diode $D_{40}$ and switch $TR_3$ connected to node 15, forming a loop separate from that of the loop containing a series connection of diode $D_{30}$ and power source $B_{20}$. Thus, by contrast to FIG. 6, in FIG. 11, only the feedback current flows through the third DC power source $B_{30}$, which acts to create the $I_B$ current, whereas the breaking current flows through the second DC power source $B_{20}$, which acts to absorb the surge current. Otherwise, this circuit functions in a manner similar to that of the circuit of FIG. 6.

Figure 12:
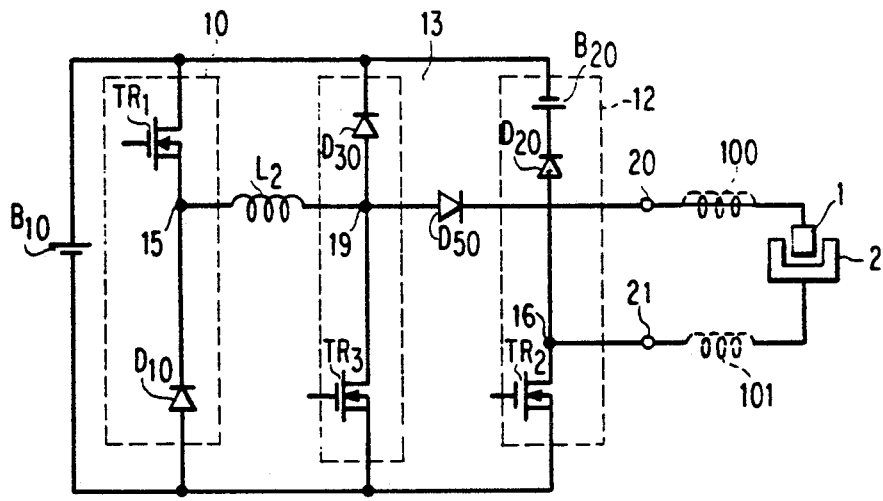
FIG. 12 is a circuit diagram showing a third embodiment of the present invention.

Next, FIG. 12 is a circuit diagram showing a third embodiment of the present invention. This third embodiment is different from the circuit of FIG. 1 in that not only the first and second series circuits 10 and 12 but also a third series circuit 13 composed of the diode $D_{30}$ and the switching element $TR_3$ is connected in parallel with the first DC power source $B_{10}$. Moreover, the reactor $L_2$ is connected between the node 15 and the node 19 defined between the diode $D_{30}$ and the switching element $TR_3$ of the third series circuit 13. The switching element connects node 19 to one terminal of power source $B_{10}$, rather than to a terminal of auxiliary power source $B_{20}$. A fifth diode $D_{50}$ is connected between the node 19 and the output terminal 20. The remaining structures are similar to those of FIG. 1.

The diode $D_{50}$ is added to prevent the voltage between the electrode 1 and the workpiece 2 from dropping when the switching element $TR_3$ is turned ON.

FIGS. 13(a) to 13(g) are timing charts of the circuit of the third embodiment, which are similar to those of FIG. 2(a)-2(g) except that the switching timings of the switching element TR₁ are slightly different.

The third embodiment performs operations similar to those of the first and second embodiments. However, what flows through the second DC power source B₂₀ is the breaking current, having a current level far lower than the peak current I$_P$. Accordingly, the second DC power source B₂₀ need have only a small current capacity.

Figure 14:
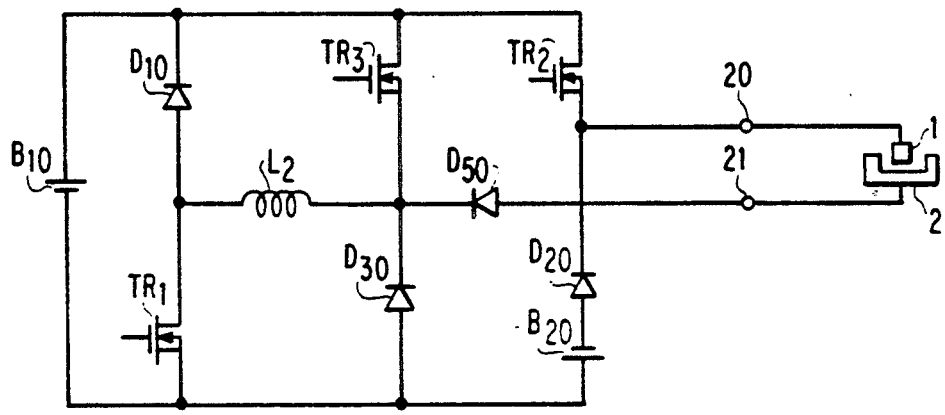
FIGS. 14 to 16 circuit diagrams showing modifications of the third embodiment.
Figure 15:
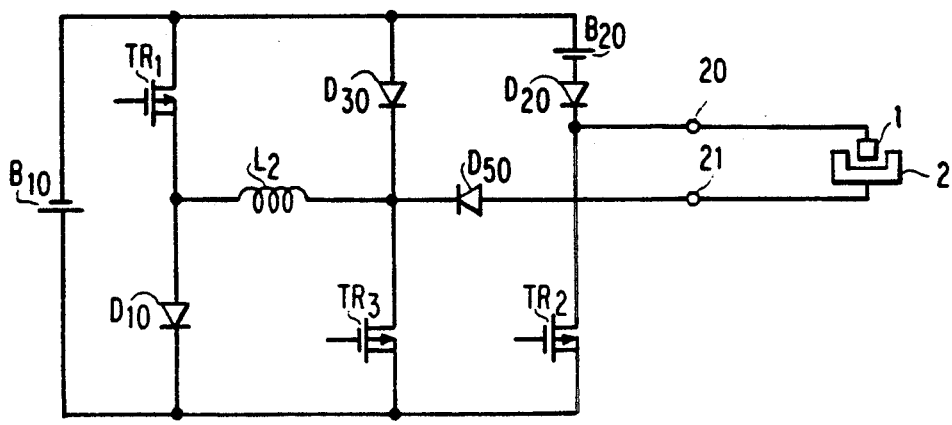
Figure 16:
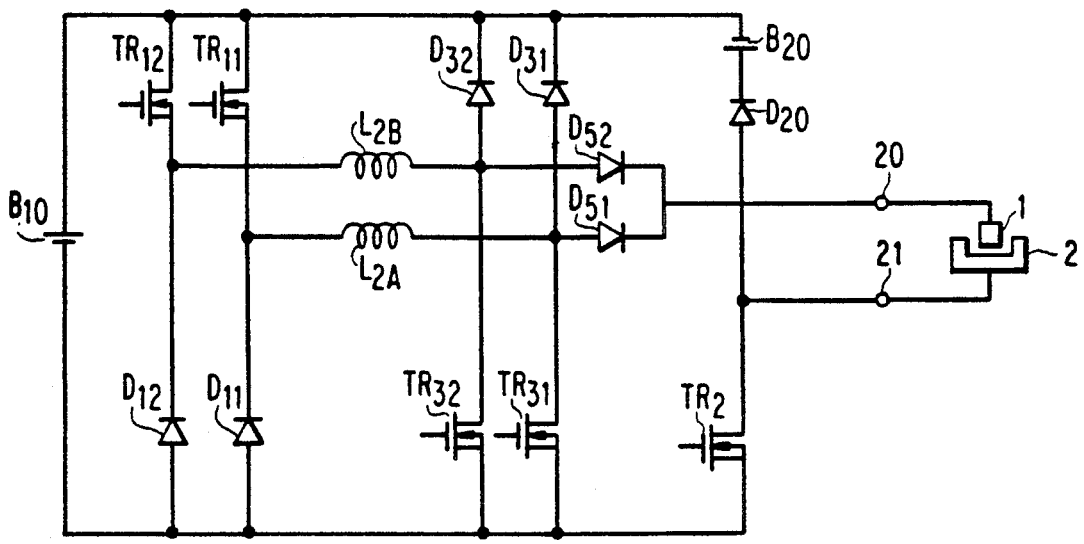

FIGS. 14 to 16 show modifications of the third embodiment that are similar to the modifications to the first embodiment shown in FIGS. 3 to 5, respectively. The operations of these circuits are again apparent from an understanding of the first and second embodiments and modifications thereof, as presented in detail herein.

In the embodiments thus far described, the reactor L₂ as the discharge current restricting element has been assumed to have a fixed inductive value. In the following case, however, a variable type reactor is used to shorten the breaking period T given by the foregoing equation (7).

Figure 17:
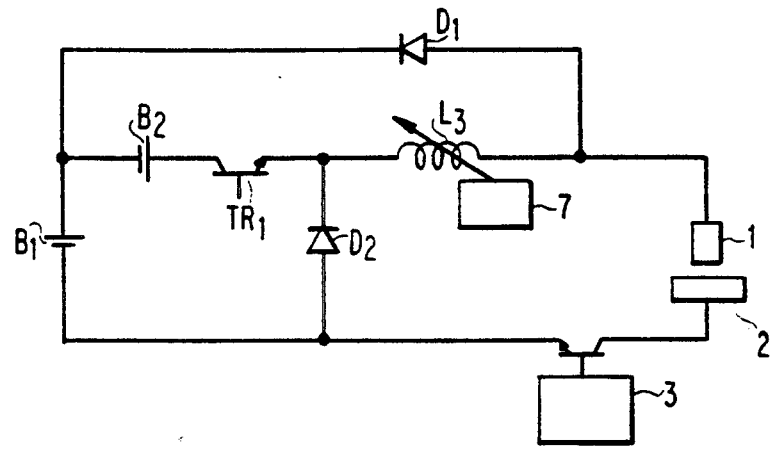
FIG. 17 is a circuit diagram showing a fourth embodiment of the present invention.

FIG. 17 is a circuit diagram showing a fourth embodiment of the present invention. This circuit is intended to optimize performance by providing an output current with an optimum range of ripple and an optimum minimum breaking time. The circuit will be described, for purposes of simplicity, as an improvement to the conventional circuit of FIG. 27, although the principles of this circuit are applicable to each of the previous embodiments.

In FIG. 17, reference character L₃ designates a reactor having a variable inductance, which is controlled by a control means 7. The inductance value L selected for the variable inductance L₃ is determined by the allowable current ripple value ΔI and the allowable minimum breaking time T$_{min}$. If the minimum ON period of the switching element TR₁ is designated as ΔT, the allowable minimum current ripple value is expressed, using Equation (3) as follows:

$$\Delta I = (E_1 + E_2 - V_{arc})/L \times \Delta T (A) \qquad (9).$$

From this Equation, it is found that the ripple value becomes smaller as the inductance L becomes higher.

From Equation (7), it is also found that the allowable breaking minimum period T$_{min}$ can be made shorter as the inductance L becomes lower.

The optimum inductance value may be determined by considering both of these offsetting factors. If the allowable ripple ratio is set at ΔI/I$_P$=R, then ΔI=I$_P$×R. The inductance valve L permitted in view of the allowable ripple is determined from the following Formula:

$$L \geq (E_1 + E_2 - V_{arc})/(I_P \times R) \times \Delta T \qquad (10).$$

If the minimum allowable breaking period is designated by T$_{min}$, the allowable inductance value L is determined from Equation (7) as follows:

$$L \leq T_{min} \times E_1/(I_P - I_B) \qquad (11).$$

Here, for I$_B$=k×I$_P$(k: a proportional constant <1), Formula (11) can be rewritten into the following form:

$$L \leq T_{min} \times E_1/(1 \times k)I_P \qquad (12).$$

Hence, the inductance value L is defined by the following Formula (from Formulas (10) and (12)):

$$|(E_1 + E_2 - V_{arc}) \times \Delta T|/(I_P \times R) \leq L \leq E_1 \times T_{min}/(1-k)I_P \qquad (13).$$

Figure 18:
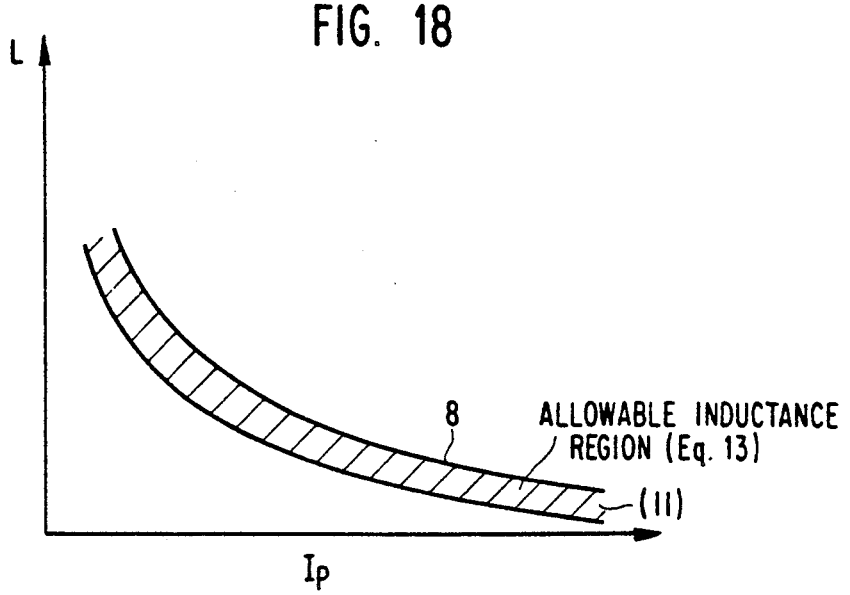
FIG. 18 is a graph presenting the region of the allowable inductance values.

FIG. 18 presents the region which is defined by Formula (13), located between curves defined by Formulas (10) and (12). The hatched portion 8 indicates the allowable inductance region. The values R and T$_{min}$ appearing in Formula (13) can be changed according to the value I$_P$. For example, those values would be larger for the region of large I$_P$ than for the region of small I$_P$.

Figure 19:
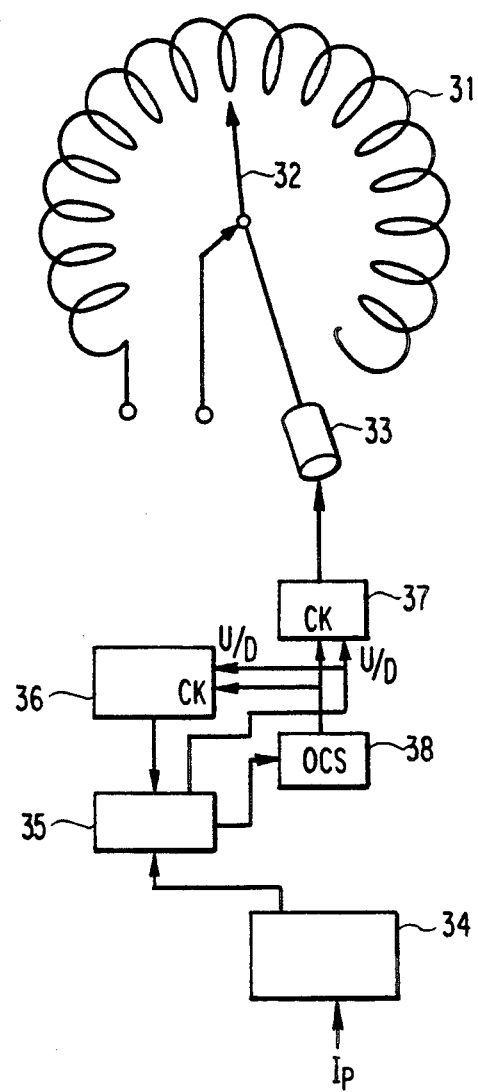
FIG. 19 is a diagram showing the structure of one embodiment of the inductance value changing control circuit.

FIG. 19 is a diagram showing the structure of the variable capacity reactor L₃ and the control means 7. In FIG. 19, coil 31 may have its inductance value changed and set according to the position of a sliding contact 32 moveable by a pulse stepping motor 33. The step motor 33 is controlled by a command pulse number sent to a comparator 35 from a memory 34, such as a ROM which may store a data table having pulse numbers corresponding to inductance values selectable in accordance with various values of I$_P$. The comparator 35 compares the command with the value of a counter 36 to determine the rotating direction of the motor 33 and sends an UP/DOWN signal to a pulse motor driver 37 and the counter 36. Moreover, the comparator 35 takes the difference between the value of the counter 36 and the current command to provide an oscillator 38 with a movement number. Then, oscillator 38 sends the commanded number of pulse to the pulse stepping motor driver 37 so that the pulse stepping motor 33 is enabled to position the sliding contact 32 to the commanded position to obtain a desired inductance value. These pulses are also sent to the counter 36 so that the present value can be up dated.

While the above embodiment uses an inductor of the variable capacity type, as an alternative structure, a plurality of coils having different inductance values may be selectively switched into the circuit.

Figure 20:
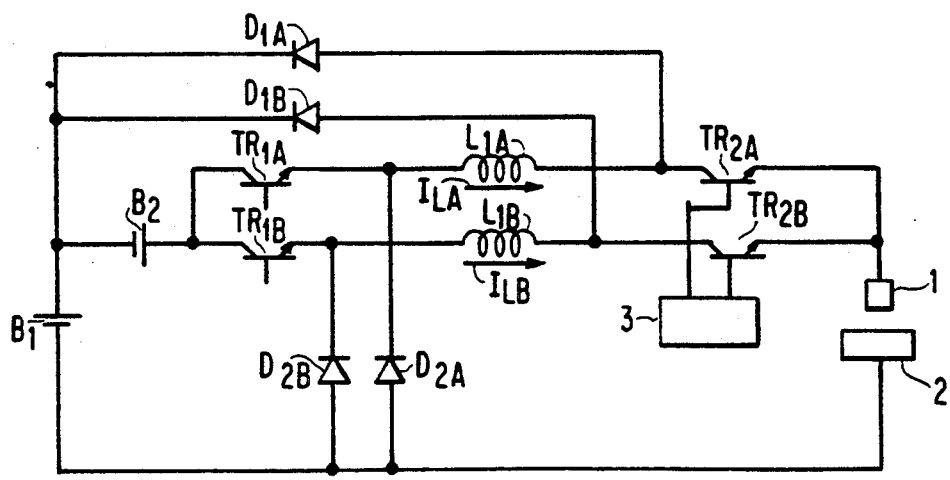
FIG. 20 is a circuit diagram showing a fifth embodiment of the present invention.

FIG. 20 is a circuit diagram showing a fifth embodiment of the present invention which is yet another improvement of the conventional circuit of FIG. 27. Unlike the improvement of FIG. 17, the inductance value is not changed. Instead, reactors having equal inductance values are used to construct a plurality of circuits. (The circuits of FIGS. 5, 10 and 16 correspond to the case in which the inductance values may be different, but the concept of the fifth embodiment can be applied specifically to the case of a common inductance value.)

FIG. 20 shows the case of two overlapping circuits, which have their respective components suffixed by letters A and B. In order to prevent each of the two circuits from feeding current to the other, switching elements TR$_{2A}$ and TR$_{2B}$ are inserted at positions in the path of each reactor connection to the electrode 1.

In the fifth embodiment, the operations of any one circuit are identical to those of FIG. 27. The two circuits operate alternately in the fifth embodiment, as shown in FIG. 21, and the breaking time for each circuit is (OFF time ×2 + ON time + unloading time). The current ripple ΔI calculated in Equation (9) can thus be reduced to about one third if the inductance value L of Equation (7) can be increased about three times. As shown in FIG. 22, moreover, the inhibition region of T$_{min}$ of FIG. 19 is not violated for one value L₀.

Figure 23:
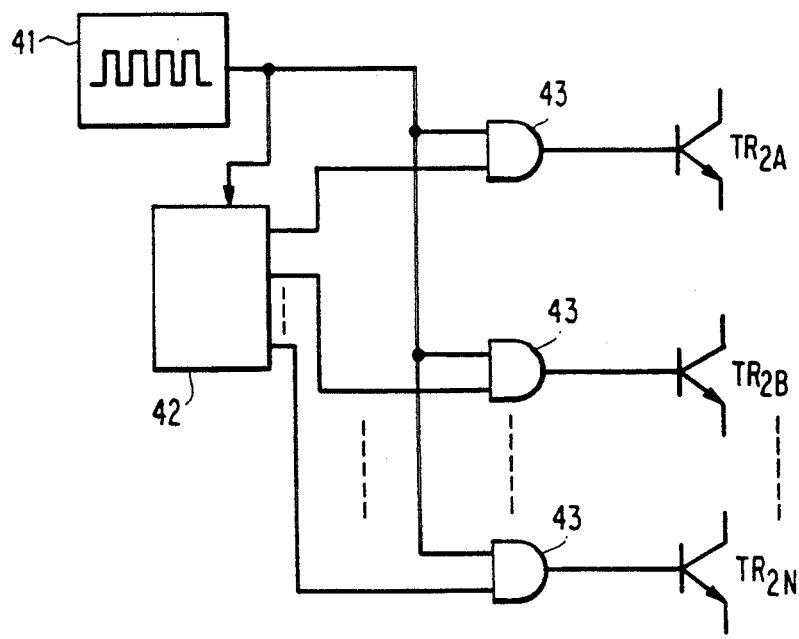
FIG. 23 is a diagram showing the structure of the oscillation control circuit of the fifth embodiment.
Figure 24:
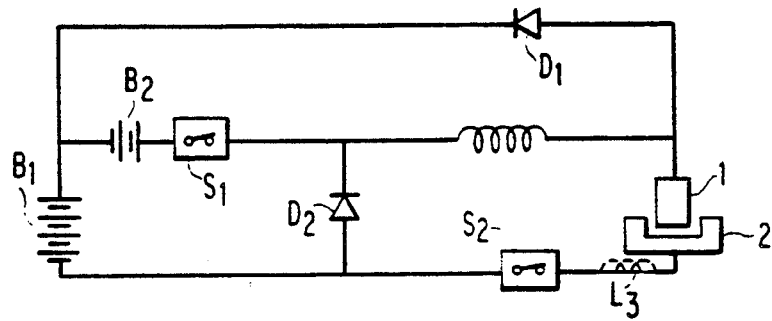
FIG. 24 is the waveform control circuit of the prior art.
Figure 25:
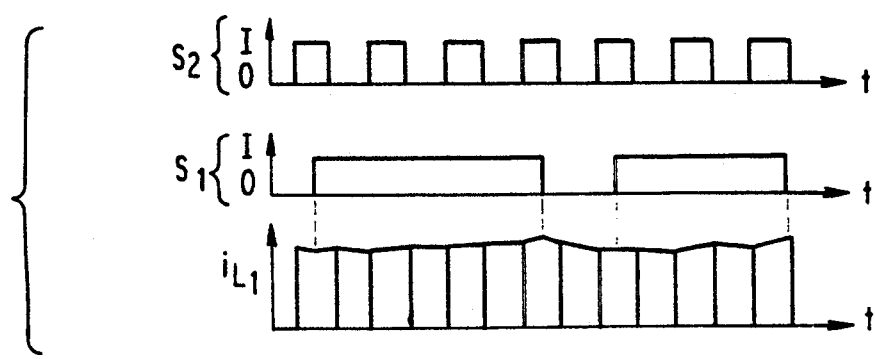

Next, the switching elements $TR_{2A}$ and $TR_{2B}$ and an oscillation control circuit 3 will be described with reference to FIG. 23. Reference numeral 41 designates an oscillator for generating and sending oscillation pulses (ON-OFF times) to each of AND gates 42 and gate selectors 43. These gate selectors 43 are operated by the pulses sent from the oscillator 41 and the AND array 42 to send out signals cyclically. The selectors drive their corresponding transistors $TR_{2A}$, $TR_{2B}$, - - - , and $TR_{2B}$ by ANDing the AND array outputs and the oscillation pulses.

As has been described hereinbefore, several significant effects can be attained from the present invention. First, the high voltage that may be established by the wiring inductances 100 and 101 at the electrode and the workpiece is released through a second series circuit to the first DC power source so that it can be prevented from being built up.

Second, the voltage of the second DC power source or the first DC power source is applied to the reactor $L_2$ by the switching element $TR_3$ so that the reactor is fed with a constant current. As a result, the base current can rise promptly to establish the discharge current waveform.

Third, the current that flows through the second DC power source is either the difference of the base current, i.e., the feedback current from the breaking current or the breaking current itself, and it may be one third or less of the peak current. Thus, a power source of low current capacity can be used to produce the discharge machining apparatus at a reasonable cost.

Fourth, the disclosed embodiments make it possible to realize discharge machining having high reliability and accuracy.

Fifth, a reactor of variable capacity type may be used as the discharge current limiting element and, in that case, the quiescent time and the current ripple ratio can be minimized over a wide region of peak current values to achieve energy economy.

Finally, plural circuits having an equal inductance value may be selectively operated one by one. In such case, the change of the inductance need not be accomplished to produce current pulses which have a small current ripple ratio and which are stable and reproducible with a short minimum quiescent time.

What is claimed is:

1. A waveform control device for connection to an electrode and workpiece of an electrical discharge machining apparatus, comprising:
   first and second DC power sources;
   a first series circuit connected in parallel with said first DC power source and comprising a first switching means and a first diode which define a first node therebetween;
   a second series circuit connected in parallel with said first DC power source and comprising said second DC power source, a second switching means and a second diode, a second node being defined between said second switching element and said second diode;
   reactor means disposed in a circuit including an electrode and a workpiece and connecting said first node and said second node;
   third switching means, disposed in a circuit connecting a third node, defined between said second DC power source and said second diode, and said first node; and
   a third diode disposed in a circuit connecting a fourth node, defined between the first DC power source and said second DC power source, and a fifth node defined between said reactor means and one of said electrode and said workpiece.

2. A waveform control device as set forth in claim 1, wherein said first series circuit comprises a plurality of series circuits, and wherein said reactor means comprises a plurality of reactors and said third switching means comprises a plurality of switching elements, a respective one of said reactors and one of said switching elements being connected to a respective one of said series circuits.

3. A waveform control device for an electrical discharge machining apparatus, comprising:
   a first series circuit and a second series circuit connected in parallel with a first DC power source, each circuit comprising a respective switching means, a diode and a node defined therebetween;
   reactor means disposed in a third circuit comprising an electrode and a workpiece and connecting the node between the switching element and diode of said first series circuit and the node between the switching element and diode of said second series circuit;
   a second DC power source and a third diode disposed in series in a circuit connecting the node between said first DC power source and said second series circuit and a node between said reactor and one of said electrode and said workpiece; and
   a third switching means and a fourth diode means disposed in series in a circuit connecting the node between said second DC power source and said third diode and the node between the switching element and diode of said first series circuit.

4. A waveform control device as set forth in claim 3, wherein said first series circuit comprises a plurality of series circuits, and wherein said reactor means, said third switching means and said fourth diode means comprise a plurality of reactors, a plurality of switches and a plurality of diodes, respectively, said plurality being a number which is the same number as that of said series circuits.

5. A waveform control device for connection to an electrode and workpiece of an electrical discharge machining apparatus, comprising:
   first and second DC power sources;
   first series circuit means connected in parallel with said first DC power source and comprising a first switching element and a first diode which define a first node therebetween;
   a second series circuit means connected in parallel with said first DC power source and comprising said second DC power source, a second switching element and a second diode, a second node being defined between said second switching element and said second diode;
   third series circuit means connected in parallel with said first DC power source and comprising a third switching element and a third diode, a third node being defined between said third switching means and said third diode,
   fourth diode means disposed in a circuit comprising said electrode and said workpiece and connecting said third node and said second node; and
   a reactor connected between said first node and said third node.

6. A waveform control device for an electrical discharge machining apparatus, as set forth in claim 5, wherein each said first series circuit means and said third series circuit means comprises an equal number of series circuits, and wherein said reactor means comprises a plurality of reactors and said fourth diode means comprises a plurality of diodes, a respective one of said reactors and a respective one of said diodes being connected to a respective one of said series circuits.

7. A waveform control device for an electrical discharge machining apparatus, as set forth in any one of claims 1, 3 or 5, wherein said reactor is of variable capacity type, having its inductance value changed and controlled in accordance with the peak value of the discharge current.

8. A waveform control device for an electrical discharge machining apparatus, as set forth in any one of claims 2, 4 or 6, wherein said plural reactors have an identical inductance value, and cyclic operations of each circuit are performed.

9. A waveform control device for an electrical discharge machining apparatus, as set forth in any one of claims 2, 4 or 6, wherein at least two of said plural reactors have different inductance values and said values are selected in accordance with the peak value of the discharge current.

10. A waveform control device for an electronic discharge machining apparatus operative to apply current across the gap between an electrode an a workpiece connected by wiring having an inherent inductance, comprising:

first circuit means, comprising a first DC power source having a first voltage, for establishing a current flow in said device at a base current level; and second circuit means comprising second power source having a second voltage, a reactor and a first switching means having at least first and second states, for applying a current at a peak level to said gap when said switching means is in said first state and for terminating application of said current to said gap when said switching means is in said second state, said first and second circuit means being connected to apply said base current to said gap when said switching means is in said first state.

11. The waveform control device of claim 10 wherein said first circuit is operative to absorb a surge current due to said wiring inductance and clamp the voltage across said gap at a predetermined level when said switching means switches from said first to said second state.

12. The waveform control device of claim 10 wherein the voltage of said first power source is smaller than the voltage of said second power source.

13. The waveform control device of claim 10 wherein said first circuit means further comprises a second switching means, switchable between a first and second state, for maintaining current flow in said device at said base current level.

* * * * *